Oct. 30, 1928.

S. S. SHEARS ET AL 1,689,458

VEHICLE SPRING

Filed Nov. 18, 1922

INVENTORS:
Sumner S. Shears
BY Edgerton Roland Wilson
George C. Heinicke
ATTORNEY.

Patented Oct. 30, 1928.

1,689,458

UNITED STATES PATENT OFFICE.

SUMNER S. SHEARS, OF BROOKLYN, NEW YORK, AND EDGARTON ROLAND WILSON, OF PETERBORO, ONTARIO, CANADA; SAID WILSON ASSIGNOR TO SAID SHEARS.

VEHICLE SPRING.

Application filed November 18, 1922. Serial No. 601,823.

This invention relates to improvements in vehicle springs as they are for instance described in our co-pending application, Serial No. 565,100, filed June 1, 1922.

It is the principal object of our invention, while retaining all of the salient features of the principle involved, in the application above mentioned, to simplify its construction and thereby reduce manufacturing cost as to make same applicable to the cheaper variety of cars, substituting flat leaf resilient members for the more expensive pivotally connected levers of said disclosed application and providing simple bell crank arms thereon.

With these and other ends in view which will become more fully apparent as the description thereof proceeds, our invention consists in the peculiar arrangement of levers pivotally fulcrumed at the vehicle frame and combined with slantingly arranged coil springs so placed or arranged as to give a substantial leverage ratio.

In the accompanying drawing, forming a material part of this disclosure:

Figure 1:
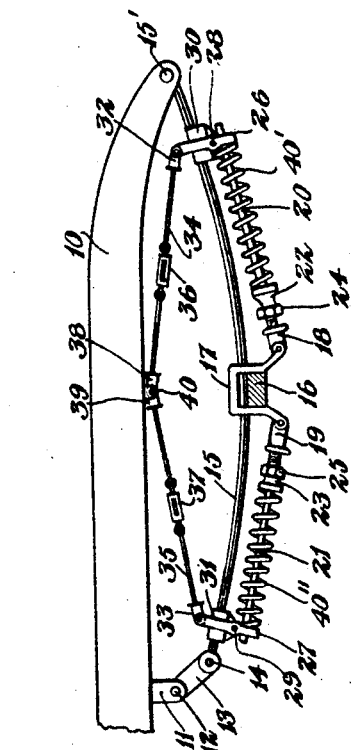
Figure 1 is a side elevational view of one form of spring arrangement constructed according to the present invention.

As illustrated in Figure 1, the frame 10 of the vehicle body carries at one end a bracket 11 to which is fulcrumed or pivotally secured as at 12, one end of a link 13 to the other end of which is secured as at 14, one end of a laminated flexible metal support 15, the other end of which is pivotally attached to the opposite end of the frame 10, as at 15′.

Intermediate its ends the resilient member rests upon the axle 16 of the vehicle, to which is secured a bracket 17, to the lower free ends of which sockets 18 and 19 are pivotally secured and adapted to receive the threaded ends of bars or rods 20 and 21. These rods carry near their inner ends adjustable collars 22 and 23 respectively, while nuts 24 and 25 allow an adjustment of these collars.

The outer ends of rods or bars rest slidably in yokes 26 and 27 pivoted at 28 and 29 respectively to blocks 30 and 31 on support 15. To the upper ends of yokes 26 and 27, the outer ends of sockets 32 and 33 are pivotally secured which receive the ends of slanting bars 34 and 35 each made in two parts connected by the turn-buckle arrangements 36 and 37. The inner ends of bars 34 and 35 are secured in similar sockets 38 and 39, pivotally secured to a lug 40 depending from frame 10. Springs 40′ and 40″ are wound around rods 20 and 21 between collars 22 and 23 and yokes 26 and 27 respectively.

Figure 2:
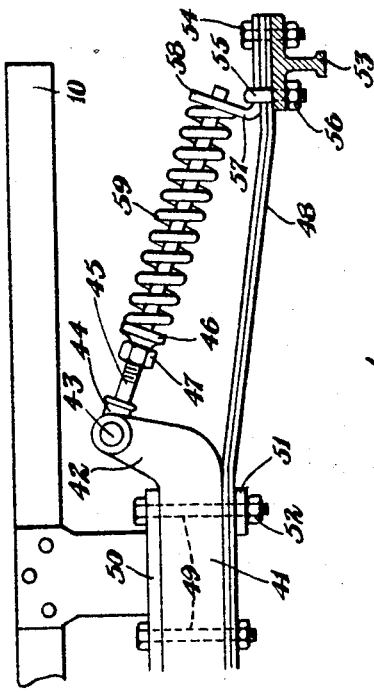
Figure 2 is a detail view of a modified form of lever and spring arrangement.

As shown in Figure 2, the bracket 41 has an upturned nose 42 to the outer end of which is pivotally secured as at 43, a socket 44 adapted to receive the inner end of a partially threaded slanting bar 45, carrying a collar 46 and an adjusting nut 47. The laminated flexible metal support 48 is secured at one end by means of bolts 49, frame hanger 50 and 51 and nuts 52, to frame 10, while the opposite end is secured to the axle 53 by means of a bolt and nut connection 54 and clip bolt 55 and nut 56; a bracket 57 having an upwardly directed perforated arm 58 is also secured by means of the aforesaid clip bolt and nut connection to the flexible metal support 48 and axle 53. The perforation of arm 58 allows the passage of the outer end of rod 45, and a spring 59 is wound around this rod between collar 46 and arm 58.

Figure 3:
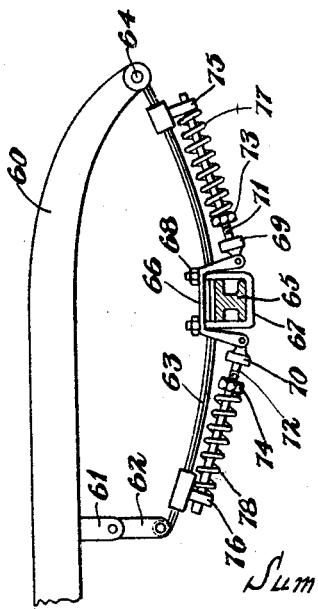
Figure 3 is a view similar to Figure 1 of another simplified form of spring arrangement.

As illustrated in Figure 3, the frame 60 carries a lug 61 to which is pivotally secured one end of a link 62, to the lower, free end of which one end of a laminated flexible metal support 63 is attached, the other end of which is pivotally attached as at 64 to the lug 61, while said resilient member intermediately its ends rests upon axle 65.

A bracket 66 is secured to this axle by means of a clip 67, the upper ends of which carry nuts 68 resting upon the upper face of bracket 66. To the lower ends of the depending arms of bracket 66, sockets 69—70 are secured, adapted to receive the inner threaded ends of slanting rods 71 and 72 carrying adjusting nuts 73 and 74.

The outer ends of rods 71 and 72 are movably projecting through perforations in yokes 75 and 76 secured to laminated flexible metal support 63, and springs 77—78 are coiled around rods 71 and 72 between nuts 73 and 74 and yokes 75 and 76 respectively.

Figure 4:
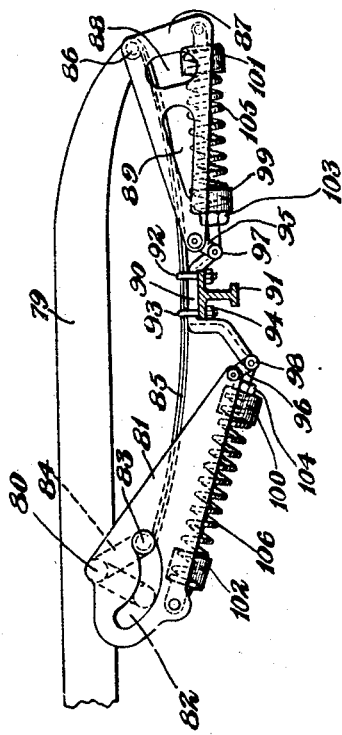
Figure 4 is a side elevational view of a still further modification of spring arrangement.

As shown in Figure 4, the frame 79 of a vehicle has pivotally attached thereto at one end as at 80, a substantially triangular bell crank lever plate 81 provided with an arcuate slot 82 in which a pin 83 at the end of a link 84 travels which is also pivoted at 80. To pin 83 the end of a laminated flexible metal support 85 is secured which is attached with its other end, as at 86 to frame 79. At 86 is also pivotally secured to frame 79 a substantially triangular bell crank lever plate 87 provided with openings 88 and 89 to decrease weight.

A bracket 90 upon which the laminated flexible metal support 85 rests, intermediate its ends is placed upon axle 91, and secured thereto by means of clips 92 and 93 and nuts 94. Links 95 and 96 are pivotally secured with one end to the ends of plates 81 and 87 respectively, and to the lower free ends of the arms of bracket 90. To the pivot points 97 and 98 are pivotally secured the inner ends of spring sockets 99 and 100, and spring sockets 101 and 102 are pivotally attached to the outer edges of plates 81 and 87 respectively, while adjusting nuts 103 and 104 on sockets 99 and 100, provide means for adjusting the compression of springs 105 and 106, which are supported between sockets 101, 99 and 100, 102 and nuts 103 and 104 respectively.

From the foregoing description the operation of the device and the action of the springs will be clear and understood without further explanation.

What we claim as new, and desire to secure by Letters Patent of the United States is—

1. Vehicle springs comprising flexible metal supports secured to the vehicle frame and axle, bell crank levers fulcrumed to the vehicle frame, pivoted links connecting said levers to the axle, and coil springs pivotally connected to the levers and axle to carry the vehicle load.

2. Vehicle springs comprising flexible metal plates pivoted at the vehicle frame and secured to the axle, bell crank levers pivotally connected to the vehicle frame at its fulcrum, and pivoted links connecting said levers to the axle, sockets pivoted to the levers and at the axle, and coil springs between the sockets to carry the vehicle load.

3. Vehicle springs in combination with a vehicle frame and axles, comprising flexible members secured to the axles and pivotally connected with the frame, brackets on the axles, substantially triangular levers between the frame and axles, links connecting the levers to the brackets, sockets on the levers and brackets, and coil springs resting in the sockets to carry the load of the vehicle.

4. Vehicle springs in combination with a vehicle frame and axle comprising a flexible metal support pivotally connected at its ends to the vehicle frame and supporting the axle near its mid section, a bracket on the axle, substantially triangularly shaped, bell-crank levers pivotally fulcrumed to the frame and movably connected to the axle bracket, and resilient means between the weight or resistance points of the bell-crank levers and axle bracket, and means for adjusting the tension of the resilient means.

5. Vehicle springs comprising flexible members pivotally connected to the vehicle frame and connected to the axles, substantially triangular, bell-crank levers, brackets on the axles, links connecting the brackets and levers, pivots connecting the levers and frame, sockets pivotally connected to the short arm of the bell-crank levers, coil springs resting in and connecting the sockets in such manner as to carry the vehicle load, and means at the sockets for adjusting the tension of the springs.

6. Vehicle springs comprising in combination with the frame of a vehicle, and its axle, bell-crank lever plates pivotally secured at the ends to said frame, a metal support attached at one end of said frame, a link at the opposite end of said frame to which the other end of said support is attached, a bracket supporting said support intermediate its ends, means for securing said support to said axle, means for pivotally supporting the free ends of said plates at said axle, and coil springs pivotally connected to the levers and axle to carry the vehicle load.

7. Vehicle springs comprising in combination with the frame of a vehicle and its axle, substantially triangular plates pivotally secured at the ends to said frame, a laminated flexible metal support attached at one end of said frame, a link at the opposite end of said frame to which the other end of said support is attached, a bracket to which said support is held intermediate its ends, means for securing said support to said axle, means for pivotally supporting the free ends of said plates at said axle, and coil springs pivotally connected to the levers and axle to carry the vehicle load.

8. Vehicle springs comprising in combination with the frame of a vehicle and its axle, substantially triangular, perforated plates pivotally secured at the ends to said frame, one of said plates having an arcuate slot, a laminated flexible metal support attached at one end to said frame, a link pivoted at one end to said frame at the pivot point of one of said plates, a pin at the other end of said link traveling in the arcuate slot of one of said plates, a bracket on the axle upon which said support rests intermediate its ends, clips for securing said support on said bracket, links pivotally secured with one end to the ends of said plates and to the lower free ends of the arms of said bracket, spring sockets pivotally secured to the pivot points of said links at said bracket arms, spring sockets pivotally attached to the outer edges of said plate, compression springs supported between each pair of said sockets, and a means for adjusting said springs.

9. In combination with a vehicle frame and axle, a flexible member fixedly secured to the axle near its mid section and connected to the frame at one end by pivot and at the other end by pivotal link, a bracket on the axle, opposed bell-crank levers fulcrumed at the frame and their power ends connected to the axle bracket by means of swinging links, a slot in the rear bell-crank lever to allow the free swing of the swinging links, spring seats pivotally attached to the levers at their weight or resistance points, spring seats pivotally connected to the axle bracket, coil springs retained by and connecting the lever and axle bracket spring seats, and means on the spring seats for adjusting the tension of the coil springs.

In testimony whereof we have affixed our signatures.

SUMNER S. SHEARS.
EDGARTON ROLAND WILSON.